Patented Apr. 19, 1938

2,114,676

UNITED STATES PATENT OFFICE 2,114,676

PROCESS FOR THE MANUFACTURE OF PURE AND RAW ACETALS

Angelo Contardi and Baldo Ciocca, Milan, Italy

No Drawing. Application June 27, 1936, Serial No. 87,766. In Italy July 26, 1935

4 Claims. (Cl. 260—151)

It is well known that if acetylene is reacted with alcohols in the presence of mercury derivatives—preferably in an acid medium—or in the presence of boron fluoride or silicon fluoride, the corresponding acetals are obtained in mixture with other secondary reaction products such as aldehydes, resins, etc.

The separation of the acetals in pure or highly concentrated conditions from the mixture thus obtained was heretofore critical and expensive.

The present application has for its subject a simple and economical method for the preparation of pure dealcoholized acetals or of alcoholic solutions with any desired acetal percentage.

1.—A first manner of operation is the following:

Into a closed boiler, made of suitable material and fitted with any convenient stirring device as well as with a refrigerating and heating arrangement, methyl alcohol is filled, the alcohol being added with 4–12% of sulphuric acid or with corresponding amounts of other acids (such as phosphoric, arsenic acids or the like) or with acid esters obtained from the alcohols and from the said acids for instance methyl sulphate.

The catalyst is then added in variable amounts viz. from 0.5 to 2.5% of the alcohol under treatment.

The catalyst preferably is mercury oxide and mercury sulphate, or a mixture of these products. It should be stated that the greater part of the other mercury salts may also be used for the same object.

After starting the stirring device, the acetylene is brought into contact with the alcohol and provisions are made to the effect that the air existing in the apparatus may escape through a valve and be replaced by acetylene. A calibrated valve with which the reaction boiler is provided permits of maintaining at the desired pressure the acetylene which has been introduced, as well as of returning into the working cycle the acetylene which eventually has been introduced in excess and does not take any active part in the reaction.

When the acetylene has been absorbed in such a quantity that it has formed the acetal in the desired concentration, the reaction should be stopped. When proceeding in the manner above described, the amount of acetylene that can be absorbed attains the theoretical value calculated for the preparation of 100% acetal.

The reaction takes place at any desired temperature, provided that the latter does not exceed the boiling temperature of the reaction liquids; the most favourable temperature lies between 40° and 60° C.

After interrupting the introduction of the acetylene, the resulting liquids should be separated from the exhausted catalyst; one should neutralize the liquids and also separate them from the neutralization products.

The total losses lie between 1–2% of the employed substances. The recovered catalyst is regenerated by the usual methods.

2.—An alternative method is described hereinafter:

Into the reaction boiler, the alcohol is filled together with the sulphuric acid in the same manner as heretofore described, and then a portion of the required catalyst is poured into the boiler. Then, while stirring, the acetylene is introduced and, when the absorption of this gas becomes low, a further amount of catalyst is added until the amount of added catalyst reaches the quantity requisite for obtaining an acetal of the desired titre. As to the progress of the operation, one should proceed as under Example 1.

3.—A third alternative mode of proceeding is the following:

⅕ of the total amount of the alcohol to be treated is poured into the reaction boiler together, for instance, with 8% of concentrated sulphuric acid containing 4% of SO₃ and together with a portion of the required catalyst. The acetylene is now introduced with the modalities specified above; when the absorption of the acetylene becomes lower, the alcohol and the catalyst are injected into the reaction boiler in several stages until completion of the boiler charge, the introduction of the acetylene being continuous all the while. The further treatment is the same as under Example 1.

The raw acetal can be further purified, for instance, by means of fractional distillation. The possible traces of methyl alcohol can be removed by treating the raw product with calcium chloride before the distillation.

The acetals obtained according to the present invention may be used either separately or mixed with other combustible liquids such as the antiknock fuels for internal combustion engines. A characteristic feature of the dimethylacetal consists in the fact that it facilitates the preparation of carburetting agents which permit of employing them in the ordinary engines without need of material modifications thereof and containing large proportions of methyl or ethyl alcohol or of mixtures of these alcohols with the most different hydrocarbons such as: petrol, naphtha, mineral oils, benzols, etc. Specially interesting is the mixture of methyl alcohol (20%), methylacetal (40%) and Diesel motor naphtha (40%). This mixture is the first example of a solution of methanol in the said naphtha, in which a synthetic and cheap derivative of the methanol itself is used as a binder.

The pure acetal and its mixtures with alcohol, petrol, benzol, acetone, ethylacetate, etc. may be used as solvents for instance for nitrocellulose instead of the acetone and of the alcohol-ether mixture. The acetal and, in a general way, its solutions may therefore be used in the lacquer, celluloid and explosive industries.

Having now particularly described and ascertained the nature of our said invention and in what manner the same is to be performed, we declare that what we claim is:—

1. Process for manufacturing acetals by reacting acetylene with alcohol in the presence of a catalyst and in acid medium, which consists in separating the acetals and the acetal-alcohol solutions from the reaction materials by neutralizing and successively removing the neutralization products, then treating the acetals and acetal-alcohol obtained with calcium chloride in order to remove the alcohol, and finally subjecting the same to fractional distillation.

2. Process for manufacturing acetals by reacting acetylene with alcohol in the presence of a catalyst and in acid medium, which consists in separating the acetals and the acetal-alcohol solutions from the reaction materials by neutralizing and successively removing the neutralization products, adding the alcohol and the catalyst in successive stages during the reaction, then treating the mixture thus obtained with calcium choride in order to remove the alcohol, and finally subjecting said mixture to fractional distillation.

3. Process for manufacturing acetals by reacting acetylene with alcohol in the presence of a catalyst and in acid medium, which consists in separating the acetals and the acetal-alcohol solutions from the reaction materials by neutralizing and successively removing the neutralization products, causing the acetylene to react with the alcohol under pressure, the pressure being limited merely by the stability of the acetylene, then treating the mixture thus obtained with calcium chloride in order to remove the alcohol, and finally subjecting said mixture to fractional distillation.

4. Process for manufacturing acetals by reacting acetylene with alcohol in the presence of a catalyst and in acid medium, which consists in separating the acetals and the acetal-alcohol solutions from the reaction materials by neutralizing and successively removing the neutralization products, adding in several stages the catalyst to the liquid intended to be used for the reaction, then treating the mixture thus obtained with calcium chloride in order to remove the alcohol, and finally subjecting said mixture to fractional distillation.

ANGELO CONTARDI.
BALDO CIOCCA.